(12) United States Patent
Anderson

(10) Patent No.: US 6,889,382 B1
(45) Date of Patent: May 3, 2005

(54) REMOTE TV CONTROL SYSTEM

(75) Inventor: Ken T. Anderson, Lafayette, CO (US)

(73) Assignee: MediaOne Group, Inc., Englewood, CO (US)

( * ) Notice: Subject to any disclaimer, the term of this patent is extended or adjusted under 35 U.S.C. 154(b) by 0 days.

(21) Appl. No.: 09/362,003

(22) Filed: Jul. 27, 1999

(51) Int. Cl.[7] .............................. H04N 9/00; H04N 7/16
(52) U.S. Cl. ....................................... 725/10; 348/155
(58) Field of Search ............................. 725/12, 11, 10, 725/110, 136, 114, 121, 9, 25–31; 348/730, 553, 155, 162–164; 340/686.1, 686.6, 552–567

(56) References Cited

U.S. PATENT DOCUMENTS

| | | | | |
|---|---|---|---|---|
| 4,439,784 A | * | 3/1984 | Furukawa et al. | 340/825.24 |
| 4,475,123 A | * | 10/1984 | Dumbauld et al. | 380/211 |
| 4,484,218 A | * | 11/1984 | Boland et al. | 455/137 |
| 4,651,342 A | * | 3/1987 | Mengel | 455/151.1 |
| 4,769,697 A | * | 9/1988 | Gilley et al. | 725/12 |
| 4,802,022 A | * | 1/1989 | Harada | 725/78 |
| 4,907,079 A | * | 3/1990 | Turner et al. | 725/11 |
| 5,278,654 A | * | 1/1994 | Yang | 348/725 |
| 5,311,325 A | * | 5/1994 | Edwards et al. | 340/5.74 |
| 5,495,302 A | * | 2/1996 | Abruna | 340/567 |
| 5,497,185 A | * | 3/1996 | Dufresne et al. | 725/11 |
| 5,600,364 A | * | 2/1997 | Hendricks et al. | 725/9 |
| 5,699,104 A | | 12/1997 | Yoshinobu | |
| 5,738,527 A | | 4/1998 | Lundberg | |
| 5,771,307 A | * | 6/1998 | Lu et al. | 382/103 |
| 5,781,108 A | * | 7/1998 | Jacob et al. | 340/517 |
| 5,793,409 A | * | 8/1998 | Tetsumura | 725/12 |
| 5,802,467 A | | 9/1998 | Salazar et al. | |
| 6,233,389 B1 | * | 5/2001 | Barton et al. | 386/46 |
| 6,260,111 B1 | * | 7/2001 | Craig et al. | 711/115 |
| 6,469,753 B1 | * | 10/2002 | Klosterman et al. | 348/552 |
| 6,588,012 B2 | * | 7/2003 | Tanaka et al. | 725/29 |
| 2003/0056208 A1 | * | 3/2003 | Kamada et al. | 735/9 |

OTHER PUBLICATIONS

Cowart, Robert; Mastering Windows 98 copyright 1998; Sybex; Chapter 7.*

* cited by examiner

*Primary Examiner*—Chris Grant
*Assistant Examiner*—Chris Nalevanko
(74) *Attorney, Agent, or Firm*—Brooks Kushman P.C.

(57) ABSTRACT

A system and method for controlling the operation of a television using a cable broadcasting network is disclosed. The presence of a viewer in front of the television is sensed, presence information is then transmitted to a cable broadcasting service center via the cable broadcasting network, a control signal is sent to the television adapted to receive same, and regular cable programming is suspended. The present invention allows the cable broadcasting company to provided additional services to the cable subscriber to retain and attract additional customers. These additional services may be tailored to the specific needs of the cable subscriber, thus a higher quality cable service is provided.

20 Claims, 3 Drawing Sheets

REMOTE TV CONTROL SYSTEM

FIELD OF THE INVENTION

The present invention relates to a system and method for controlling the operation of a television using a cable television network.

BACKGROUND OF THE INVENTION

Cable television networks for broadcasting television programs are wide spread. More and more homes are being connected to these cable broadcasting networks to receive higher quality program reception and a multitude of additional channels. In addition to standard cable programming a selection of programs are broadcasted on a pay-per-view basis, in which the program is only broadcasted and received by the viewer if an additional fee has been paid to the cable television broadcaster.

Current cable broadcasting networks only output televison programming signals to the television they do not have the capability of receiving input signals from the televison or the television viewer. One disadvantage of watching movies broadcasted by a cable television network is that if the viewer has to temporarily leave the room in which he is watching the movie there is no way to pause the broadcasting of the movie. For example, if the viewer gets a telephone call, wants to get something to eat, or has to visit the bathroom, he will do so at the sacrifice of missing the movie he is currently watching.

In contrast, videos and DVD disks played on a video cassette recorders and DVD players respectively, of course, may be paused or stopped momentarily by the movie viewer, this allows the viewer to break from watching the movie and get a snack or go to the bathroom without missing any of the movie. Current cable broadcasting companies do not provide the viewer with the option to suspend the current program and then restart the program at the point where it was paused.

Accordingly, there is a need to provide an remote television control system and method which has the capability of changing the broadcasted signal in response to the viewers input. Furthermore, the remote television control system and method should have the additional capability to change the operation of the television.

SUMMARY OF THE INVENTION

Accordingly, it is an object of the present invention to provide a method and system for using a cable broadcasting network to control the operation of television at a cable subscriber's residence.

It is another object of the present invention to provide method and system for using a cable broadcasting network to control the operation of television based on the presence of a viewer at a cable subscriber's residence.

In accordance with these and other objects, the present invention provides a method and system for controlling the operation of a television using a cable broadcasting network. The presence of a viewer in front of the television is sensed, presence information is then transmitted to a cable broadcasting service center via the cable broadcasting network, a control signal is sent to the television adapted to receive same, and regular cable programming is suspended. The present invention allows the cable broadcasting company to provided additional services to the cable subscriber to retain and attract more customers. These additional services may be tailored to the specific needs of the cable subscriber, thus a higher quality cable service is provided.

Thus, in accordance with one aspect of the present invention, a method is provided for controlling the operation of a television using a cable broadcasting network, wherein the cable broadcasting network comprises at least one cable broadcasting service center in communication with a plurality of subscriber residences via a coaxial cable transmission system. The method includes sensing a presence of a person in a room, transmitting the presence information to a cable broadcaster service center, sending a control signal to a television adapted to receive same, and suspending regular cable programming in response to the control signal.

In accordance with another aspect of the present invention, a system is provided for controlling the operation of a television using a cable broadcasting network, wherein the cable broadcasting network comprises at least one cable broadcasting service center in communication with a plurality of subscriber residences via a coaxial cable transmission system. The system includes a transducer for sensing the presence of a person in a room, a cable network for transmitting a control signal between a cable network service center and a cable subscriber residence, a control circuit for receiving the control signal sent by the cable network service center and for suspending regular programming.

The advantages accruing to the present invention are numerous. For example, the present invention allows a television to be operated by a cable broadcasting service center located remotely from a subscribers residence. The present invention provides customer feedback to the cable broadcasting center regarding the cable subscriber's needs. The cable broadcasting center fulfills the cable subscriber's needs by providing services which are tailorable to predetermined choices made by the cable subscriber.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
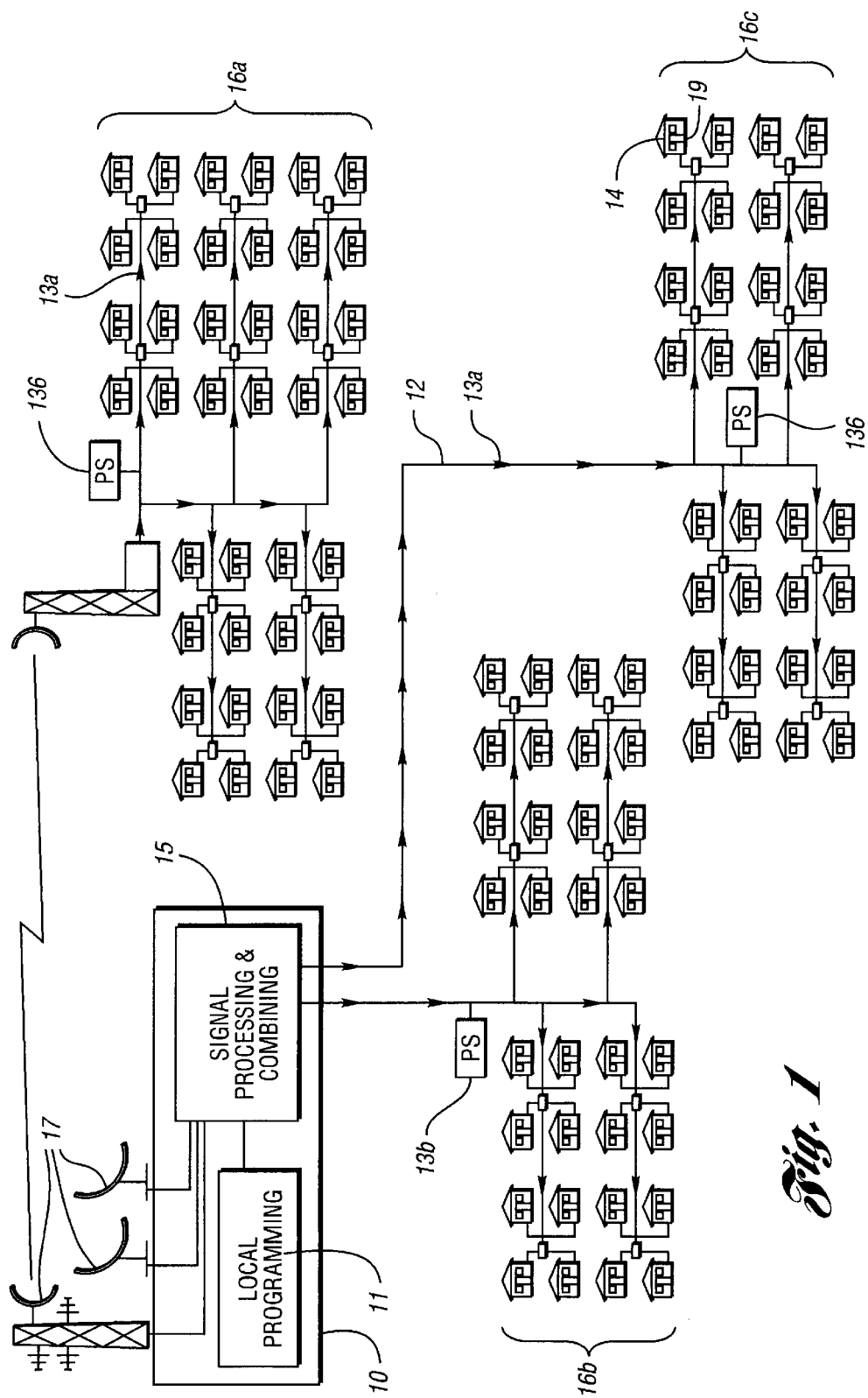
FIG. 1 is a block diagram illustrating a cable broadcasting service center, a cable television broadcasting network comprised of coaxial cable and a typical subscriber residence having at least one television for receiving cable programs, according to the present invention.

Turning now to FIG. 1, there is shown a preferred embodiment of a remote television control system, according to the present invention. The remote television control system of FIG. 1 is comprised of a head-end cable programming source facility (or CATV service center) 10, a cable network 12 and a plurality of subscriber residences 14 which include televisions 16. The CATV service center 10 receives a broadcasting wave, containing cable television programming, from a satellite or a ground station and then distributes the broadcasting wave through the cable network 12 to the multitude of subscriber residences 14. Typically, more than 50 channels are available and are received by the subscribers.

Satellite dishes 17 receive and can retransmit cable television programs to be viewed by cable subscribers in their residences 14. The CATV service center 10 processes the broadcasting waves received by the satellite dishes 17 and combines them with local programming 11 through a signal processing and combining circuitry as represented by block 15. The combined local and national cable programming is retransmitted to the subscriber residences 14 via a network of high speed cables 12. The cables may be a fiber optic ring or a coaxial cable or a combination there of. Additionally, an antenna 17a may be employed to transmit the combined cable broadcasting signal to a distant neighborhood 16a. The distant neighborhood 16a has a receiving antenna 17b for receiving the cable programming signal and rebroadcast the signal to the subscriber residences 14. Signal amplifiers 13a are located along the cable network to ensure that an appropriate signal strength is maintained. Remote power stations 13b are provided in the remote neighborhoods 16a, 16b, and 16c to power the signal amplifiers 13a. Of course, depending on the size of the neighborhood and distance from the CATV service center 10 more or less remote power stations 13b and signal amplifiers 13a will be required.

Figure 2:
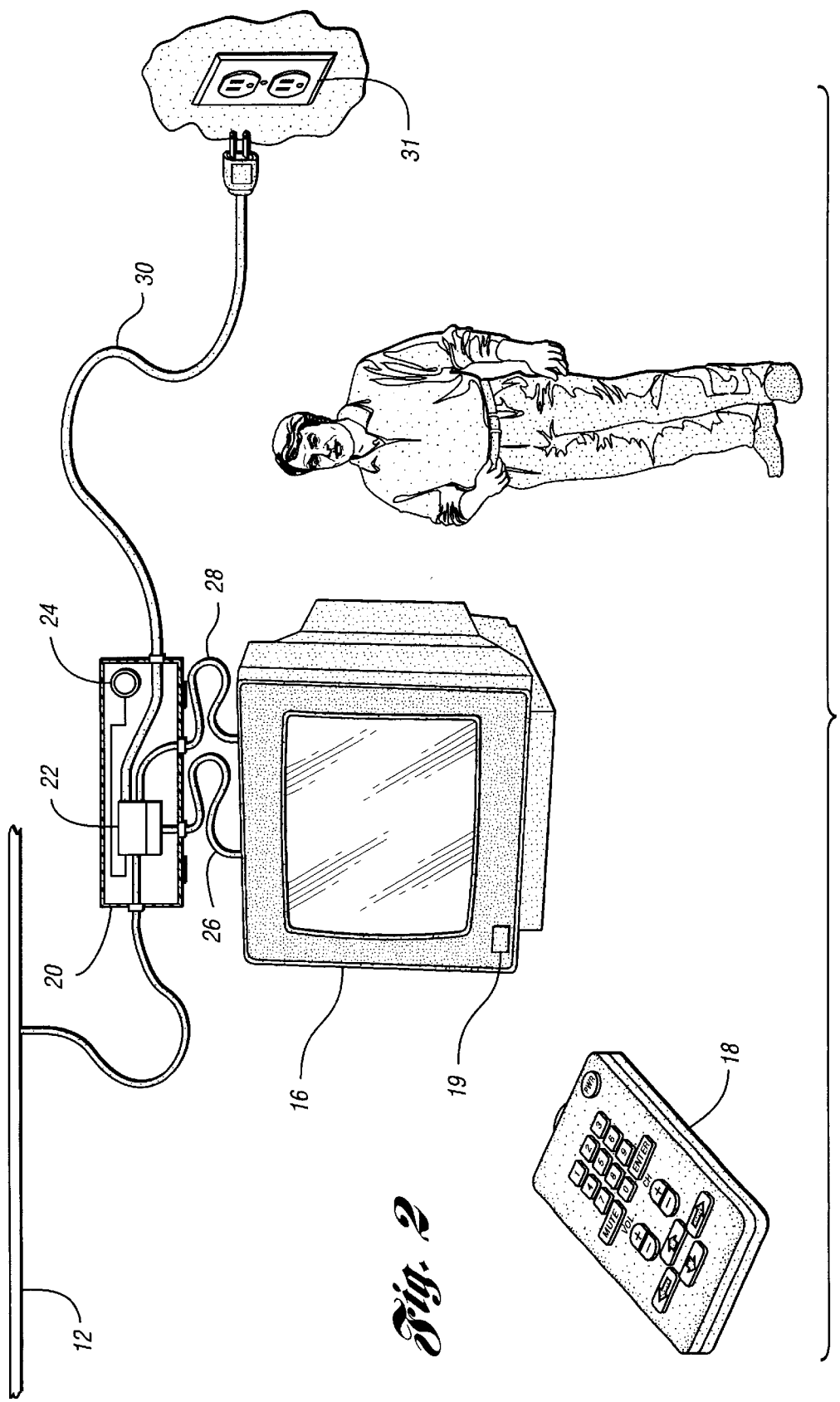
FIG. 2 is a block diagram illustrating a cable television subscriber residence having a system for controlling the operation of a television according to the present invention.

Referring now to FIG. 2, a subscriber television system is shown according to the present invention. The subscriber television system includes a television 16 having a remote controller 18 and a set-top box 20. The remote controller 18 typically contains an infrared transmitter which communicates with an infrared receiver 19 located in the television 16. Generally, remote controller device 18 includes commands to change channels, increase and decrease volume, turn off and on the television 16 and a variety of other television operation commands.

Television 16 is connected to set-top box 20 via a communication cable 26 which is typically a coaxial cable or the like. Further, television 16 has a power cable 28 which is also connected to the set-top box 20. Communication cable 26 transfers communication information such as cable programming from the set-top box 20 to the television 16. The communication information may be transmitted in the form of digital or analog waves depending on the television receiver used.

Television power cable 28 is connected to the set-top box 20 so that television power may be regulated remotely through the cable network 12. More specifically, a power down circuit 22 containing appropriate switches, interrupts the AC power transferred by power cord 30 to the television 16. The power down circuit 22 is configured to receive a signal through the cable network 12 when it is desired to power down the television 16. A power interrupt switch contained in the power down circuit 22 is remotely activated to disconnect electrical power from the television 16. Power cable 30 is connected to an AC power source 31 in the subscriber's home such as a conventional wall outlet. A detailed description of how the power down circuit is operated to carry out the present invention will be described below.

With continuing reference to FIG. 2, the set-top box 20 having a presence detection circuit or sensor 24 is illustrated. Sensor 24 can be an infrared, ultrasonic, or optical sensor. Sensor 24 is in electrical communication with the cable network 12 and is configured to send an output signal through the cable network 12 to the CATV service center 10 when a person occupying the room, in which the television 16 is located, leaves the room. An output signal indicative of an unoccupied room may then be used by the CATV service center 10 to remotely operate the television 16. For example, CATV service center 10 could send a signal to the power down circuit 22 to interrupt AC power to the television 16 for the purpose of conserving power consumption at the subscriber's residence. Other remote television control operations may include interrupting regular programming and displaying an alternate program such as scenery, or messages regarding the subscriber's cable television account may also be displayed. Further, the CATV service center 10 adapted to record and re-broadcast cable television programs could use the aforementioned system to record a cable program when sensor 24 indicates a viewer has left the room and then re-broadcast the cable program once the user has re-entered the room. A more detailed description of the operation of the television system just described will now be disclosed.

Figure 3:
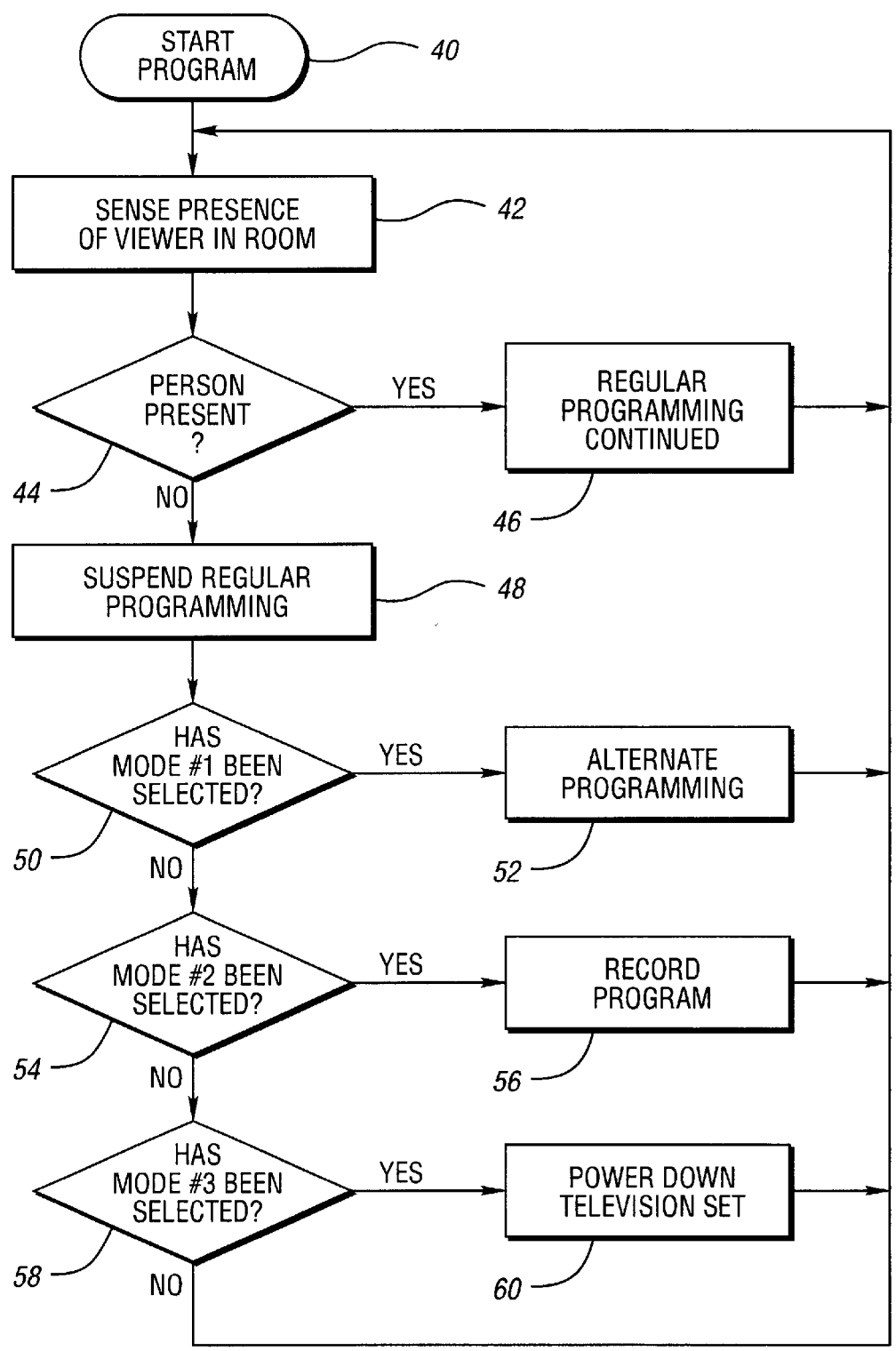
FIG. 3 is a flow diagram illustrating a method of controlling the operation of a television, using a cable broadcasting network, at a typical subscriber residence according to the present invention.

Referring now to FIG. 3, a method for operating the television system just described is presented in accordance with the present invention. It is contemplated that the following method shown in FIG. 3 may be implemented through a computer program executed locally on the set-top box 20 or remotely at the CATV service center 10. When television 16 is energized, the program for remote control of the television system is started at block 40. At block 42, the presence of a television user is sensed. At block 44, a determination is made as to whether television users are present in the television room. If television users are present, the programming selected by the television users will continue without interruption as illustrated by block 46. If at block 44 it is determined that the television users are not present, the current regular programming will be suspended as illustrated by block 48.

The present method includes three modes of operation which may be selected by the viewer. Mode one allows the user to display alternate programming. Selecting mode two will cause the CATV service center 10 to record the current cable programming when the viewer has left the room. Finally, mode three will indicate to the CATV service center 10 that the viewer would like the television powered down at the point at which the viewer left the room. At block 50 the present invention determines whether mode one has been selected by the cable subscriber. If mode one has been selected by the cable subscriber, alternate programming data is sent to the television 16 as illustrated by block 52. The alternate programming may be a nature scene such as a waterfall or a campfire, or it may take the form of advertisements. The advertisements could be tailored to the particular cable subscriber's interests profile, etc. Additionally, messages could be sent by the CATV service center 10 regarding the cable subscriber's account status such as payment information or information regarding their Internet service, such as the cable subscriber's e-mail account. If the cable subscriber has an e-mail account with the company, the subscriber could be alerted of unread e-mail messages.

If mode one has not been selected the present invention determines whether mode two has been selected as indicated by block 54. If mode two has been selected the current channel and program the television is currently set to will be recorded as indicated by block 56. The recording may take place at the subscriber's site, if the subscriber's television system is so configured, or at the CATV service center 10.

If mode two has not been selected the present invention determines whether mode three has been selected as shown by block 58. If mode three has been selected a signal is sent by the CATV service center 10 to activate the power down circuit 22 (shown in FIG. 2) located in the set-top box 20 to power down the television 16 as indicated by block 60. The power down circuit 22 temporarily disconnects the television set 16 from the electrical power source 31 thereby reducing power consumption at the subscriber residence 14. If mode three has not been selected the present invention continues to monitor the presence of television users in the room. Furthermore, as indicated by the process arrows after each of blocks 52,56 and 60 the presence of a user in the room will be monitored after each of the processes described in block 52,56 and 60 are started as indicated by block 44. Once a user has returned to the room regular programming as shown in block 46 will be re-established.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling the operation of a television using a cable network, the method comprising:
   sensing a presence of a user in proximity to the television;
   transmitting a first signal indicating the presence of the user to the cable network;
   receiving an input from a user indicating a mode selection for operating the television when the user is not in proximity to the television, the mode selection chosen from a plurality of different operation modes of the television;
   transmitting a second signal indicating the mode selection to the cable network; and
   if the user is not in proximity to the television, receiving a control signal from the cable network suspending regular cable programming and operating the television according to the mode selection.

2. The method of claim 1 wherein operating the television according to the mode selection includes powering down the television.

3. The method of claim 1 wherein operating the television according to the mode selection includes recording a television program.

4. The method of claim 1 wherein operating the television according to the mode selection includes displaying alternate programming on the television.

5. The method of claim 1 wherein sensing includes using an infrared sensor for detecting the presence of a user in proximity to the television.

6. The method of claim 1 wherein sensing includes using an ultrasonic sensor for detecting the presence of a user in proximity to the television.

7. The method of claim 1 wherein sensing includes using an optical sensor for detecting the presence of a user in proximity to the television.

8. A system for controlling the operation of a television using a cable network, the system comprising:
   a sensor for sensing a presence of a user in proximity to the television;
   a user input apparatus for receiving an input from the user indicating a mode selection for operating the television when the user is not in proximity to the television, the mode selection chosen from a plurality of different operation modes of the television; and
   a control circuit in communication with the sensor, the user input apparatus, and the cable network for transmitting a first signal indicating the presence of the user to the cable network, for transmitting a second signal indicating the mode selection to the cable network and, if the user is not in proximity to the television, receiving a control signal from the cable network suspending regular cable programming and operating the television according to the mode selection.

9. The system of claim 8 wherein the control circuit includes a powering down circuit for powering down the television.

10. The system of claim 8 further comprising a recording device for recording a television program when regular programming is suspended.

11. The system of claim 8 wherein the sensor includes an infrared sensor.

12. The system of claim 8 wherein the sensor includes an ultrasonic sensor.

13. The system of claim 8 wherein the sensor includes an optical sensor.

14. The method of claim 4 wherein displaying alternate programming includes displaying scenery.

15. The method of claim 4 wherein displaying alternate programming includes displaying an advertisement.

16. The method of claim 4 wherein displaying alternate programming includes displaying messages associated with the user.

17. The method of claim 1 further comprising displaying regular cable programming if the user is in proximity to the television.

18. The system of claim 8 further comprising a set-top box in communication with the control circuit.

19. The system of claim 8 wherein the user input apparatus includes a remote controller.

20. A method for controlling the operation of a television using a cable network, the method comprising:
   sensing a presence of a user in proximity to the television;
   transmitting a first signal indicating the presence of the user to the cable network;
   receiving an input from a user indicating a mode selection for operating the television when the user is not in proximity to the television, the mode selection chosen from a plurality of different operation modes of the television;
   transmitting a second signal indicating the mode selection to the cable network;
   if the user is not in proximity to the television, receiving a control signal from the cable network suspending regular cable programming and operating the television according to the mode selection; and
   if the user returns to proximity of the television, re-establishing regular cable programming.

* * * * *